Dec. 13, 1949 W. L. JENKINS 2,491,048
METHOD FOR MAKING TUBING AND APPARATUS THEREFOR
Filed Sept. 23, 1947 3 Sheets-Sheet 1
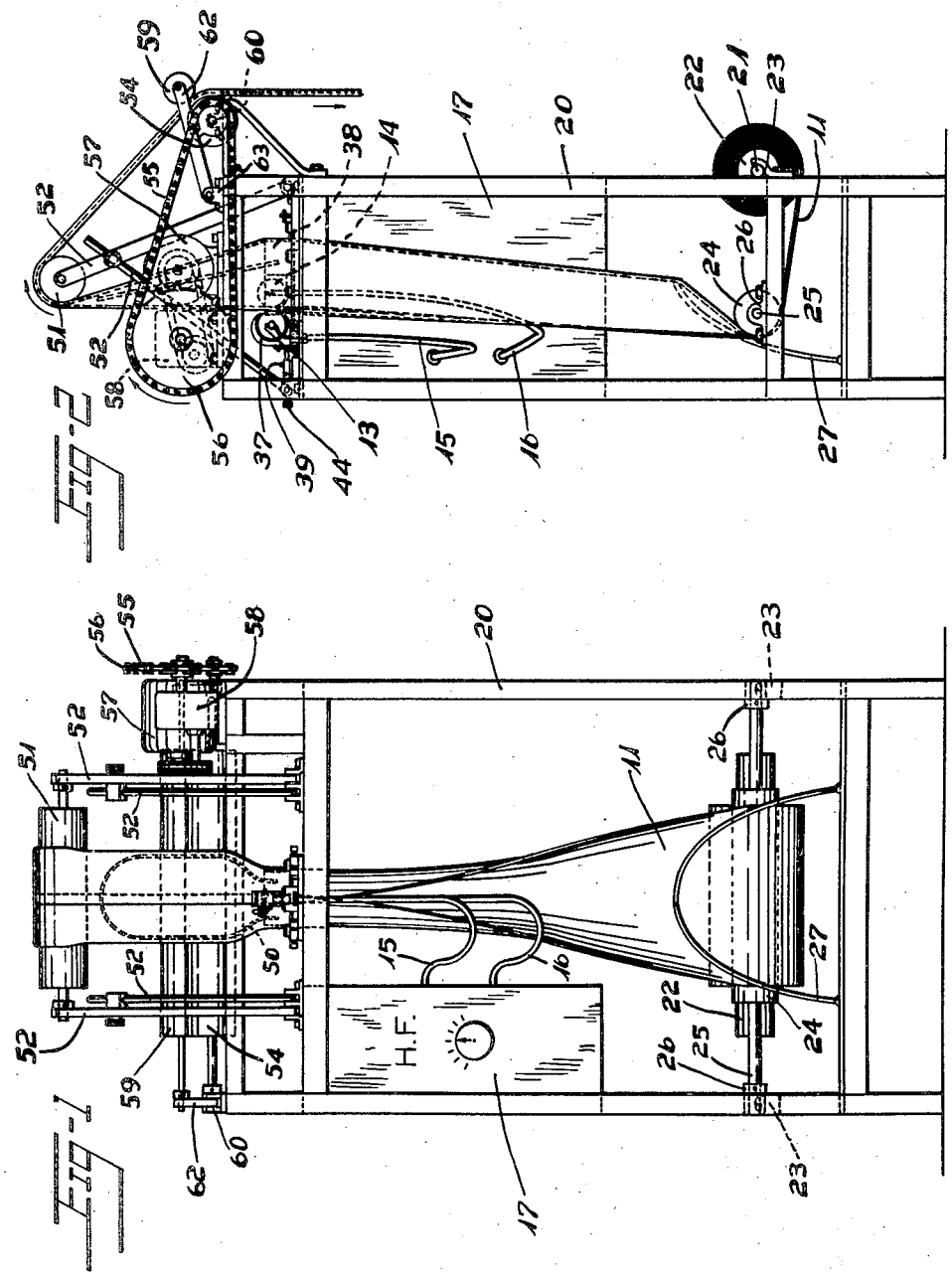
Inventor
William L. Jenkins
By Robert W. Furlong
Atty

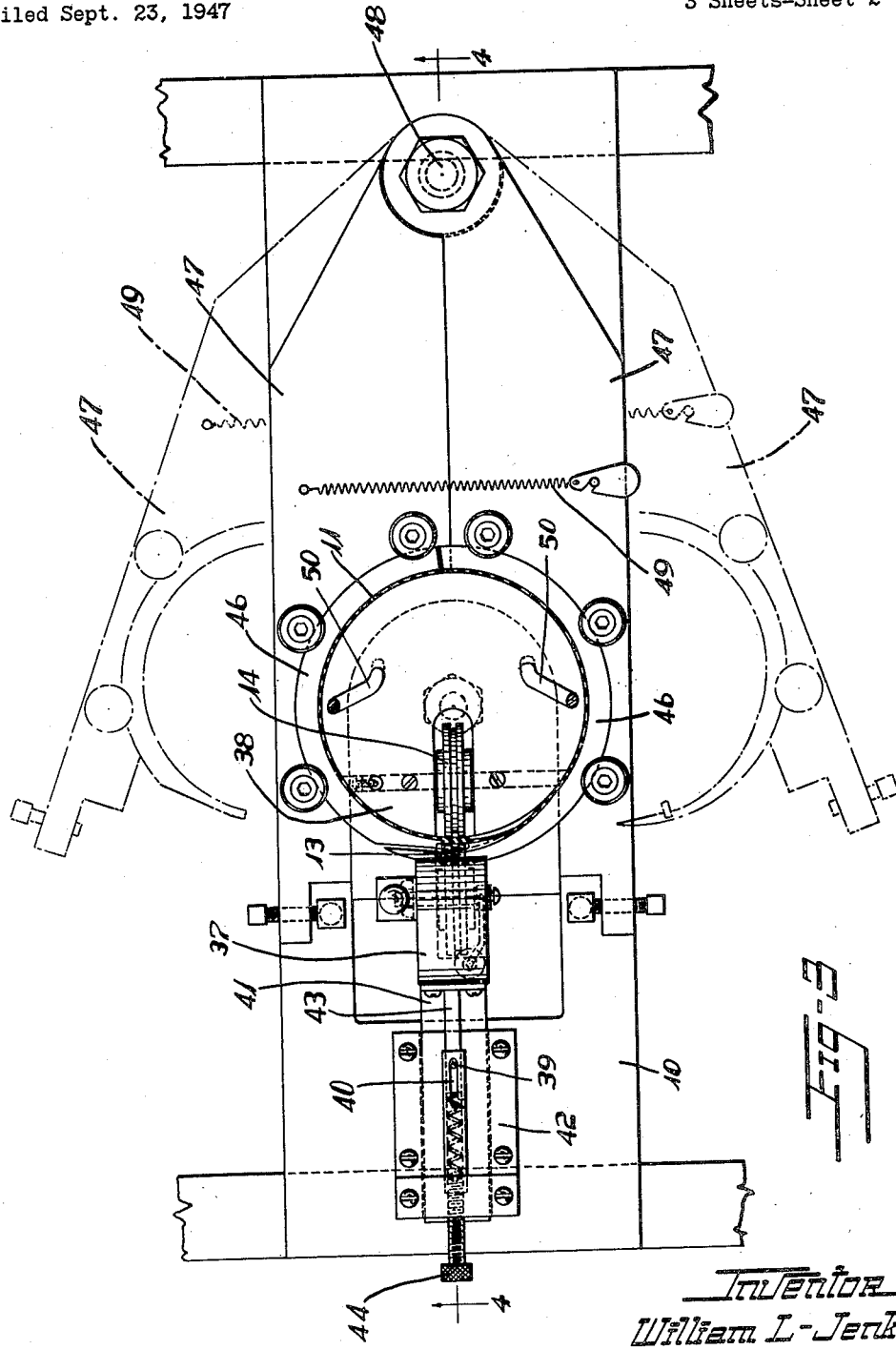

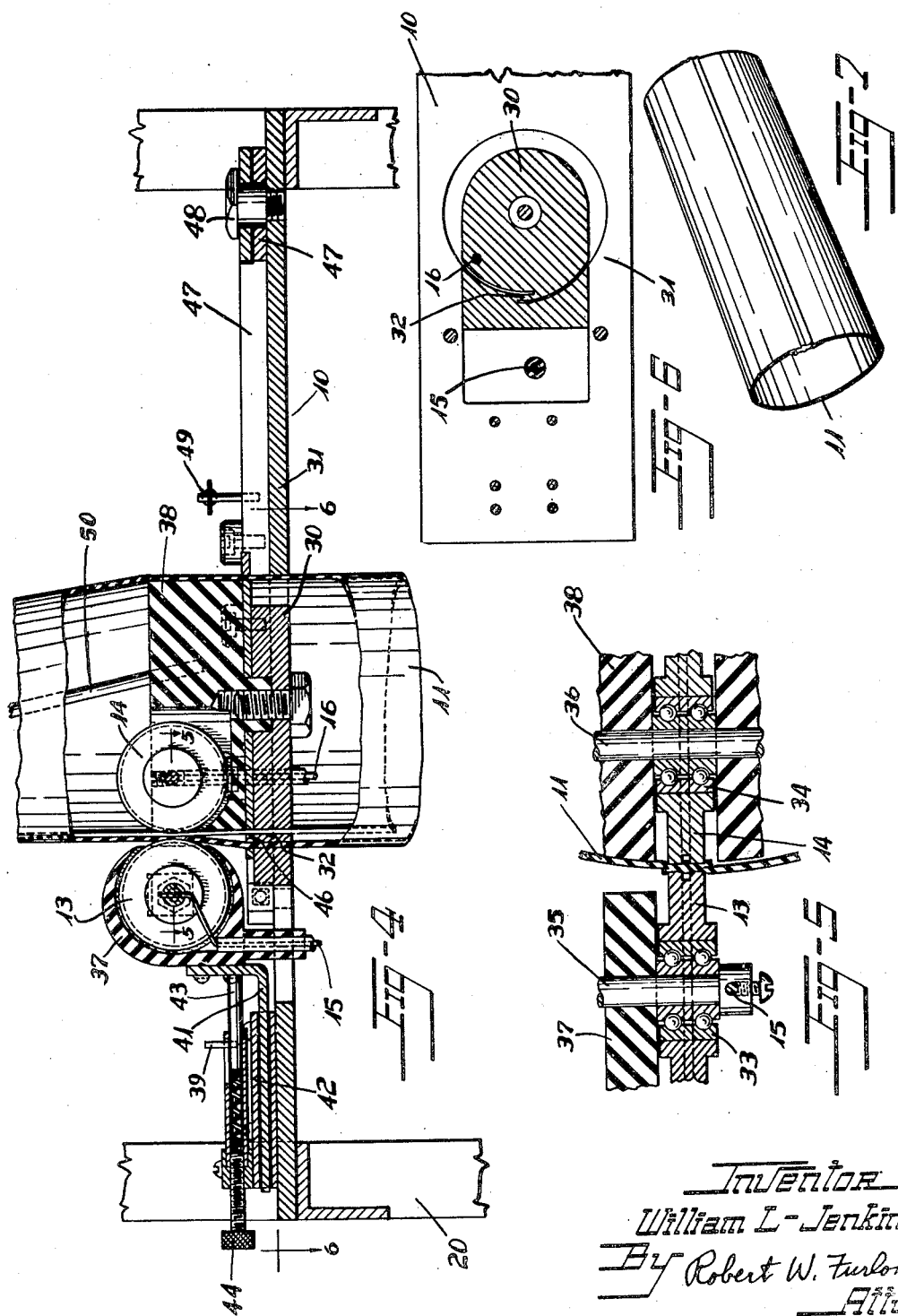

Patented Dec. 13, 1949

2,491,048

UNITED STATES PATENT OFFICE 2,491,048

METHOD FOR MAKING TUBING AND APPARATUS THEREFOR

William L. Jenkins, Akron, Ohio, assignor to The B. F. Goodrich Company, New York, N. Y., a corporation of New York Application September 23, 1947, Serial No. 775,651

10 Claims. (Cl. 154—42)

1

This invention relates to a method for making tubing and apparatus therefor, and is particularly concerned with a method for making tubing from sheet thermoplastic material and preferred apparatus therefor.

Small diameter tubing, particularly relatively thick-walled tubing, is commonly made by extrusion in a continuous process. The extrusion method has several serious disadvantages, however, when used to make large diameter tubing. The die area is necessarily large and difficult to heat uniformly, and the mass of thermoplastic material which must be heated is great. Non-uniform heating of the die and the material results in variations in the wall thickness of the extruded tubing. Furthermore, in the case of thin-walled tubing, the tubing collapses upon emergence from the extrusion die and it is difficult to prevent adhesion of the collapsed walls. Extrusion methods, in general, have a further serious disadvantage in necessitating prolonged heating of the thermoplastic material with a resultant deleterious effect on the material due to volatilization losses, heat breakdown etc.

Large diameter tubing therefore has commonly been made in relatively short lengths by wrapping a strip of the sheet material around a suitably shaped mandrel, splicing the edges together, and stripping the tubing from the mandrel. Although this was necessarily a tedious process, it was used to insure consistently uniform tubing since thermoplastic material of uniform thickness may readily be produced in sheet form by calendering, etc. Such a wrap-around method was necessarily piecewise, however, because it was difficult to seal the edges rapidly on the mandrel. It was also difficult to prevent the buckling of the edges being sealed while moving along the mandrel and if excessive longitudinal tension was exerted on the tubing, it tended to undergo plastic flow at the softened edges.

The objects of this invention include providing a method for making tubing from material in sheet form, and particularly providing a method for making tubing from thermoplastic material in sheet form by a continuous process whereby uniform tubing is consistently produced. Other objects of this invention are to provide apparatus of simple design, which may be easily operated to form tubing from thermoplastic material in sheet form by utilizing high-frequency energy. Further objects will be apparent from the description which follows.

In general, tubing is formed according to this invention by bringing successive portions of a sheet of thermoplastic material into a generally tubular shape with the margins in overlapping relation, and pressing the overlapped portions together while subjecting the overlapped portions to high-frequency alternating electrostatic energy sufficient to seal the portions together.

The apparatus embodying this invention is best illustrated by reference to the accompanying drawings.

Of the drawings:

Fig. 1 is a front view in elevation of preferred apparatus for making tubing from thermoplastic material in sheet form;

Fig. 2 is a side view in elevation of the preferred apparatus shown in Fig. 1;

Fig. 3 is a plan view of the forming member and sealing element of the preferred apparatus;

Fig. 4 is a section on line 4—4 of Fig. 3;

Fig. 5 is a section on line 5—5 of Fig. 4;

Fig. 6 is a section on line 6—6 of Fig. 4; and

Fig. 7 is a perspective view of tubing prepared in accordance with this invention.

The preferred apparatus for making tubing in accordance with this invention as shown in Fig. 1 comprises essentially a forming member 10 (Fig. 6) adapted to bring sheet material 11 into a generally tubular condition with the margins thereof in overlapping relation, and a sealing element adjacent the forming member 10 and including opposed adjustably spaced freely rotatable roller members 13 and 14 electrically joined by cable leads 15 and 16 to a high-frequency oscillator 17. The roller members 13 and 14 are adapted to press together the overlapping margins of material brought into tubular condition by the forming member 10 and to subject the overlapped margins to a high-frequency alternating electrostatic field to fuse the margins together.

The preferred apparatus comprises a skeletal supporting frame 20. A feed roll 22 is mounted on the lower part of frame 20 with the shaft 21 of feed roll 22 rotatably supported on the lower part of frame 20 by bracket supports 23, 23, which are secured to frame 20.

Feed roll 22 is adapted to introduce thermoplastic sheet material 11 into the apparatus. Guide roll 24 is mounted adjacent feed roll 22 with the roll shaft 25 journaled in bracket bearings 26, 26 secured to frame 20. Guide member 27 of inverted generally U-shape is secured to frame 20 and extends diagonally over and closely adjacent to guide roll 24, being so arranged as to press against sheet material 11 feeding off roll 24 and bow it into a channel-shaped condition.

The forming member 10 (Fig. 6) is mounted horizontally on frame 20 above guide roll 24 and guide member 27 and comprises an inner portion 30 generally concentric with and spaced from an outer portion 31, the inner portion being joined to the outer portion by a neck portion 32 which lies tangential to a zone of inner portion 30. Thus, the inner and outer portions 30 and 31 define a generally spiral aperture extending transversely through the member 10, the aperture serving to bring the sheet material passing through the forming member into a generally tubular condition with the margins in overlapping relation.

The sealing element mounted on forming member 10 comprises a pair of spaced roller members 13 and 14 mounted on bearing bushings 33 and 34, which in turn are mounted on roller shafts 35 and 36, which are held in roller guards 37 and 38. Roller shafts 35 and 36 are electrically joined to oscillator 17 by means of cable leads 15 and 16. Roller members 13 and 14 are constructed either wholly of electrically conducting materials such as metal or have circumferential metal surfaces electrically joined to the roller shafts. Alternatively, the roller members may be of laminated construction with a conducting layer positioned between non-conducting outer layers. The conducting layers may be of smaller diameter than the non-conducting layers if desired so that an air gap is normally maintained between the conducting layers of the opposed roller members.

Roller guards 37 and 38 are constructed of a non-conducting material such as hard rubber, phenol-formaldehyde resin or similar material. Guard 37 for roller member 13 comprises a shell-like housing partially enclosing member 13 and is secured to angle support 41, which is held by channel guide 42 within which the angle support 41 is free to move longitudinally. Channel guide 42 is secured to forming member 10. Roller 13 is pressed against thermoplastic material passing between roller members 13 and 14 by means of spring loaded pin 43, which is adjusted by means of set screw 44. The longitudinal motion of roller 13 is limited by means of pin 39 which moves in slot 40 of the spring guide.

Roller guard 38 comprises a generally cylindrical member bolted to the inner portion 30 of forming member 10, the guard being slotted to hold roller member 14 opposed to roller member 13 so that the roller surfaces are in planes generally parallel to the neck portion 32 of forming member 10.

Preferably, supplementary hinged guides are fastened to the forming member 10 so as to overlie the member. The supplementary guides preferably comprise a pair of complementary generally semi-circular jaws 45, 46, rigidly held by supporting members 47, 47, which are secured by a swivel pin 48, which allows the jaws 45, 46 to be spread apart. The jaws are normally maintained in contiguous relation by spring 49 secured to support members 47, 47, with the tips of the jaws in overlapping relation to assist in guiding the thermoplastic material to the roller members.

A wire guide member 50, preferably of generally elliptical shape, is mounted on roller guard 38 and extends generally vertically from the guard; the guide member being adapted to spread tubing emerging from forming member 10 and sealing element into a flattened condition. A guide roll 51 is positioned above guide member 50 and is journaled in and supported by support beams 52, 52, secured to frame 20. Support beams 52, 52 are arranged so that they may be adjusted to vary the position of guide roll 51.

A driven roll 54 is journaled in bracket bearing 60, 60, secured to frame 20, the roll being actuated by chain and sprocket drive 55 which engages gear wheel 56 rotated by motor 57 through gear box 58. Idler roll 59 is journaled in rocker arms 62, 62, which are movably mounted on brackets 63, 63, secured to frame 20. Idler roll 59 rides on and is rotated by driven roll 54.

In making tubing according to this invention using the preferred apparatus detailed hereinabove, a roll of thermoplastic material in sheet form is provided. The thermoplastic material may be any flexible material which may be heat-softened to a flowable condition, in which condition layers of the materials fuse together under slight pressure. Such materials, for example, include plasticized polyvinyl chloride, polyvinylidene chloride and copolymers or mixtures of these materials or similar materials with polyvinyl acetate or similar material. The thermoplastic material may, of course, contain the usual softeners, fillers, reinforcing materials, etc.

The sheet material is brought off feed roll 22 under guide roll 24 and past guide member 27, which brings the material into a generally channel-like shape. The material is then advanced to forming member 10 which brings the sheet into a generally tubular condition with the margins in overlapping relation and through the supplementary guide which insures precise positioning of the overlapped edges before passage through the sealing element.

The overlapped margins are then advanced between roller members 13 and 14 which are so spaced as to apply progressive rolling pressure to the margins passing therebetween. High-frequency alternating electrostatic current is supplied to the roller members by oscillator member 17 and the roller members act as electrodes to maintain a high-frequency electrostatic field through the overlapped margins. The high-frequency currency is preferably of the order of 1 to 1000 megacycles per second although frequencies as high as 5000 megacycles or higher may be used. The overlapped margins are thus heated dielectrically to a flowable condition and are fused together by the pressure of the roller members to form tubing. Since the roller members are frictionally rotated by passage of the margins therebetween, there is no tendency for the margins to buckle while being fused. The tubing thus formed is flattened by passage around elliptical guide 50 and over guide roll 51. The guide roll 51 is positioned so as to exert a substantially uniform tension on all parts of the tubing as it emerges from the forming member and sealing element. Preferably, roll 51 is not positioned directly above the space between the roller members but is displaced slightly so that the seam of the tubing, as it extends from between roller members 13, 14 to roll 51, does not lie in a perfectly vertical plane, but instead is inclined slightly toward driven roll 54 so that the outer overlapped margin of the tubing is pulled inwardly against the inner margin as the tubing emerges from the sealing element, thus reducing any tendency of the sealed margins to pull apart before they are completely cooled and also to further prevent the outer surface of the seam from buckling and forming a crinkled surface.

The lateral displacement of the roll is slight, however, so that no undue tension is exerted on the softened edges which would cause the tubing to stretch in that region. The flattened tubing then passes between driven roll 54 and idler roll 59. The idler roll 59 provides sufficient pressure so that the tubing is frictionally advanced by driven roll 54, which also serves to progressively advance the sheet material through the forming member and sealing element whereby tubing is formed in a continuous process.

The preferred apparatus is adapted to form tubing of various diameters merely by varying the circumference of the forming channel. The roller members are adjustably spaced to accommodate various thicknesses of sheet material. If desired, the roller members may be peripherally grooved to provide a reinforced portion in the zone where the overlapped margins are joined together, and also to allow considerable flow of the thermoplastic materials in that zone to insure complete sealing.

By means of this invention, thermoplastic material in sheet form is readily formed into large diameter thin-walled tubing of uniform quality by a continuous process. The apparatus is of simple design and is readily adapted to form tubing from sheet materials of various widths and thicknesses. The tubing is formed without the necessity of heating large masses of material as is necessary in extruding tubing. The tubing thus formed has a uniform wall thickness and the seam is smooth, uncrinkled and of uniform width. Only a localized zone of the tubing has been subjected to heat sufficient to cause it to flow, and this localized zone is heated for only a short period of time.

Variations and modifications may be effected in the preferred apparatus and the method of making tubing within the spirit and scope of the invention as defined in the appended claims.

I claim:

1. Apparatus for forming tubing from a sheet of thermoplastic material, said apparatus comprising a forming member having a generally spiral aperture extending transversely through said member adapted to bring said sheet into a generally tubular condition with the longitudinal margins thereof in overlapping relation, a sealing element adjacent said forming member including means for pressing said overlapped margins together and means for subjecting said overlapped margins to a high-frequency electrostatic field, and means for progressively advancing said thermoplastic material through said forming member and sealing element.

2. Apparatus for forming tubing from a sheet of thermoplastic material, said apparatus comprising a forming member having a generally spiral aperture extending transversely through said member, a sealing element adjacent said forming member including opposed contiguous roller members and means for maintaining a high-frequency alternating electrostatic field between said roller members, and means for progressively advancing material through said forming member and sealing element.

3. Apparatus for forming tubing from a sheet of thermoplastic material, said apparatus comprising a forming member which comprises an inner portion generally concentric with an outer portion, said inner portion being spaced from said outer portion and joined to said outer portion by a neck portion lying tangential to a zone of said inner portion, a sealing element adjacent said forming member comprising opposed adjustably spaced electrically conducting roller members, said roller members being electrically joined to a source of high-frequency alternating electrostatic current, and means for progressively advancing thermoplastic material through said forming member and said sealing element.

4. Apparatus for forming tubing from a sheet of thermoplastic material, said apparatus comprising a forming member which comprises an inner portion generally concentric with an outer portion, said inner portion being spaced from said outer portion and joined to said outer portion by a neck portion lying tangential to a zone of said inner portion, a sealing element adjacent said forming member comprising opposed adjustably spaced electrically conducting roller members having the roller surfaces thereof lying generally parallel to the neck portion of the said forming member, said roller members being electrically joined to a source of high-frequency alternating electro-static current, paired rotatable rolls adapted to progressively advance thermoplastic material through said forming member and sealing element, and means for rotating said rolls.

5. Apparatus for forming tubing from a sheet of thermoplastic material, said apparatus comprising a forming member which comprises an inner portion generally concentric with an outer portion, said inner portion being spaced from said outer portion and joined to said outer portion by a neck portion lying tangential to a zone of said inner portion, a sealing element adjacent said forming member including opposed adjustably spaced roller members having the roller surfaces thereof generally parallel to the neck portion of said forming member and means for maintaining a high-frequency alternating electrostatic field between said roller members, paired rotatable rolls adapted to progressively advance thermoplastic material through said forming member and sealing element, means for rotating said rolls, a guide member adapted to bring sheet material into a generally channel-like condition before said material enters said forming member, and means for flattening tubing emerging from said sealing element.

6. In combination with an element adapted to seal layers of thermoplastic material together, a forming member comprising an inner portion generally concentric with an outer portion, said inner portion being spaced from said outer portion and joined to said outer portion by a neck portion lying tangential to a zone of said inner portion.

7. The method of making tubing from thermoplastic material which comprises providing said material in sheet form, progressively advancing said material, bringing successive portions of said sheet into a channel shape, forming successive portions of said channel-shaped sheet into generally tubular form with the margins thereof in overlapping relation, bringing said overlapped margins into contact, sealing said margins together to form a tube by pressing said overlapped margins together by means of progressive rolling pressure while softening said margins to a flowable condition with high-frequency alternating electrostatic energy, allowing said softened sealed margins to cool below the flow point thereof, and flattening said tube by progressive rolling pressure.

8. In combination with means for sealing together opposed margins of thermoplastic sheet material, a forming member having a generally spiral aperture extending transversely therethrough adapted to bring a sheet of thermoplastic material into generally tubular shape with its margins opposed, and means for advancing said sheet through said forming element and sealing means.

9. Apparatus for making tubing from thermoplastic sheet, said apparatus comprising means for progressively advancing said sheet, means for bowing said sheet to a U-shape, a forming member having an aperture extending transversely therethrough adapted to bring said U-shaped sheet into generally tubular shape with its margins opposed, and means for heat-sealing together the opposed margins of said sheet.

10. The apparatus of claim 9 in which said heat-sealing means comprises means for subjecting said opposed margins to a high frequency electrostatic field.

WILLIAM L. JENKINS.

REFERENCES CITED

The following references are of record in the file of this patent:

UNITED STATES PATENTS

| Number | Name | Date |
| --- | --- | --- |
| 2,145,941 | Maxfield | Feb. 7, 1939 |
| 2,222,011 | Zwoyer | Nov. 19, 1940 |
| 2,324,068 | Crandell | July 13, 1943 |
| 2,358,455 | Hallman | Sept. 19, 1944 |
| 2,387,566 | Custers | Oct. 23, 1945 |
| 2,438,498 | Geist, Sr. et al. | Mar. 30, 1948 |